US008550017B2

(12) United States Patent
Terushita et al.

(10) Patent No.: US 8,550,017 B2
(45) Date of Patent: Oct. 8, 2013

(54) METHOD AND APPARATUS OF CONTROLLING EXHAUST GAS IN OXYFUEL COMBUSTION BOILER

(75) Inventors: Shuuhei Terushita, Tokyo (JP); Toshihiko Yamada, Tokyo (JP); Shuzo Watanabe, Tokyo (JP); Terutoshi Uchida, Tokyo (JP)

(73) Assignees: IHI Corporation, Tokyo (JP); Electric Power Development Co., Ltd., Tokyo (JP)

( * ) Notice: Subject to any disclaimer, the term of this patent is extended or adjusted under 35 U.S.C. 154(b) by 398 days.

(21) Appl. No.: 12/920,704

(22) PCT Filed: Mar. 6, 2008

(86) PCT No.: PCT/JP2008/000471
§ 371 (c)(1),
(2), (4) Date: Nov. 9, 2010

(87) PCT Pub. No.: WO2009/110033
PCT Pub. Date: Sep. 11, 2009

(65) Prior Publication Data
US 2011/0107944 A1    May 12, 2011

(51) Int. Cl.
*F23B 70/00* (2006.01)
(52) U.S. Cl.
USPC .......... 110/204; 110/341; 110/188; 73/23.31; 73/23.32; 73/23.33
(58) Field of Classification Search
USPC .......................................... 110/341, 204, 188
See application file for complete search history.

(56) References Cited

U.S. PATENT DOCUMENTS

| 3,519,254 | A  | * | 7/1970 | Putman ........................... 432/21 |
| 6,935,251 | B2 |   | 8/2005 | Marin et al. |
| 2004/0261671 | A1 | * | 12/2004 | Taylor ........................... 110/261 |
| 2005/0058958 | A1 | * | 3/2005 | Kobayashi et al. ............. 431/10 |
| 2007/0250215 | A1 | * | 10/2007 | Jia et al. ......................... 700/274 |
| 2008/0160464 | A1 | * | 7/2008 | Ghani et al. ..................... 431/9 |
| 2009/0031933 | A1 |   | 2/2009 | Ookawa et al. |
| 2009/0272300 | A1 |   | 11/2009 | Yamada et al. |

FOREIGN PATENT DOCUMENTS

| JP | 4-244504 A | 9/1992 |
| JP | 5-26409 A | 2/1993 |
| JP | 5-168853 A | 7/1993 |
| JP | 5-172305 A | 7/1993 |

(Continued)

OTHER PUBLICATIONS

U.S. Appl. No. 12/920,549, filed Sep. 1, 2010, Yamada, et al.

(Continued)

*Primary Examiner* — Kenneth Rinehart
*Assistant Examiner* — Boa D Nguyen
(74) *Attorney, Agent, or Firm* — Oblon, Spivak, McClelland, Maaier & Neustadt, L.L.P.

(57) ABSTRACT

Provided are a method and an apparatus of controlling exhaust gas in an oxyfuel combustion boiler which can attain stable combustion of the boiler while an amount of unburned combustibles and a $NO_x$ density in exhaust gas are maintained in their allowable ranges. A rate of supply of directly supplied oxygen to burners 6 to a total amount of oxygen produced by an air separation unit 18 is regulated in an operating range where the $NO_x$ density in the exhaust gas is below a NOx limit value and the amount of unburned combustibles in the exhaust gas is blow an unburned combustible limit value to thereby attain stable combustion of the oxyfuel combustion boiler.

15 Claims, 4 Drawing Sheets

(56) References Cited

FOREIGN PATENT DOCUMENTS

| | | |
|---|---|---|
| JP | 5-231609 A | 9/1993 |
| JP | 6 101809 | 4/1994 |
| JP | 7-318016 A | 12/1995 |
| JP | 11 14034 | 1/1999 |
| JP | 2001 74208 | 3/2001 |
| JP | 2001-235103 A | 8/2001 |
| JP | 2001-336736 A | 12/2001 |
| JP | 2007 147162 | 6/2007 |
| WO | WO 2007/061106 A1 | 5/2007 |

OTHER PUBLICATIONS

U.S. Appl. No. 12/920,542, filed Sep, 1, 2010, Terushita, et al.
U.S. Appl. No. 12/920,843, filed Sep. 3, 2010, Terushita, et al.
U.S. Appl. No. 12/920,602, filed Sep. 2, 2010, Terushita, et al.
U.S. Appl. No. 12/920,738, filed Sep. 2, 2010, Terushita, et al.

* cited by examiner

METHOD AND APPARATUS OF CONTROLLING EXHAUST GAS IN OXYFUEL COMBUSTION BOILER

TECHNICAL FIELD

The present invention relates to a method and apparatus of controlling exhaust gas in an oxyfuel combustion boiler.

BACKGROUND ART

An increased carbon dioxide ($CO_2$) density in the atmosphere has proved to be one of major factors of global warming which has recently come into attention as a global-scale environmental problem. A thermal power plant appears close-up as a fixed source of discharging these substances. Fuel for thermal power generation may be oil, natural gas and coal, among which coal is especially anticipated to have a large future demand due to its greater potential reserves.

Coal contains a higher percentage of carbon as compared with natural gas and oil, together with other components such as hydrogen, nitrogen and sulfur, and ash as an inorganic component. Therefore, when coal is burned in the air, most of the composition of the combustion exhaust gas is occupied by nitrogen (about 70%), with the remainder occupied by carbon dioxide $CO_2$, sulfur oxide $SO_X$, nitrogen oxide $NO_X$, dust comprising ash and unburned coal particles, and oxygen (about 4%). The combustion exhaust gas is thus subjected to exhaust gas treatments such as denitration, desulfurization and dust removal so that $NO_X$, $SO_X$ and particulates fall under their respective environmental emission standard values before the emission to the atmosphere through a stack.

$NO_X$ occurring in the combustion exhaust gas is divided into a thermal $NO_X$ generated from oxidization of nitrogen in the air by oxygen and a fuel $NO_X$ generated as a result of oxidization of nitrogen in the fuel. Up until now, a combustion method of lowering the flame temperature has been employed for reduction of the thermal $NO_X$ whereas another combustion method of forming a fuel-excess region for deoxidizing $NO_X$ within a boiler has been employed for reduction of the fuel $NO_X$.

In the case of using a fuel containing sulfur such as coal, a wet or dry desulfurizing device has been provided to remove $SO_X$ occurring in the combustion exhaust gas as a result of the combustion.

It is desired on the other hand that a large amount of carbon dioxide generated in the combustion exhaust gas be also separated and captured at a high efficiency. A possible method of capturing carbon dioxide in the combustion exhaust gas has hitherto been reviewed which includes a method of causing an amine or other liquid absorbent to absorb it, an adsorption method of causing a solid adsorbent to adsorb it or a membrane separation method, all of which have a low recovery efficiency, thus not yet reaching a practical use level of the $CO_2$ capture from a coal burning boiler.

Accordingly, a technique of burning a fuel with oxygen instead of air has been proposed as an effective technique to address at one time both the problem of separation of carbon dioxide in the combustion exhaust gas and the problem of suppression of the thermal $NO_X$ (see, for example, Patent Literatures 1 and 2).

When coal is burned with oxygen, generation of the thermal $NO_X$ is not seen and most of the combustion exhaust gas is occupied by carbon dioxide with the remainder occupied by other gases containing the fuel $NO_X$ and $SO_X$, consequently achieving a relatively easy liquefaction and separation of the carbon dioxide through cooling of the combustion exhaust gas.

[Patent Literature 1] JP 5-231609A
[Patent Literature 2] JP 3053914B

SUMMARY OF INVENTION

Technical Problems

In a conventional air combustion boiler, stable combustion in its burner is facilitated by controlling a weight ratio (A/C) of an amount of a primary air as carrier air for pulverized coal produced by a mill to an amount of pulverized coal from the mill. Flame may be blown off when the A/C is too high while stable combustion cannot be kept from the structure of the mill-burner system when the A/C is too low. Thus, the A/C is set and controlled within a predetermined range for the operation according to the boiler.

In order to reduce the fuel $NO_X$, a combustion method has been employed in which a portion of the exhaust gas is recirculated to the burner so as to form in the burner an insufficient-air area for deoxidization of $NO_X$.

However, in case of an oxyfuel combustion boiler as disclosed in Patent Literatures 1 and 2, the primary air is not introduced due to a difference in the combustion system from the conventional air combustion, so that the A/C cannot be regarded as an indicator for the stable combustion by the burner, dissimilar to the existing air combustion boiler. Further, properties of the exhaust gas are also significantly different from those in the case of air combustion. Accordingly, it is expected that an index capable of attaining the stable combustion of the oxyfuel combustion boiler be established in consideration of properties of the exhaust gas.

The invention was made in view of the above and has its object to provide a method and apparatus of controlling exhaust gas in an oxyfuel combustion boiler which can attain stable combustion of the oxyfuel combustion boiler while $NO_X$ density and unburned combustibles in exhaust gas are in maintained allowable predetermined ranges.

Solution to Problems

The invention is directed to a method of controlling exhaust gas in an oxyfuel combustion boiler having a primary recirculation passage for introduction of a part of exhaust gas in recirculation into a mill as primary recirculated exhaust gas and for supply of pulverized coal pulverized by the mill to burners of the boiler by said primary recirculated exhaust gas, a secondary recirculation passage for supply of another part of the recirculated exhaust gas to a wind box of the boiler, an air separation unit, a secondary oxygen mixing passage for supply of a part of oxygen produced by the air separation unit to the secondary recirculation passage and a direct supply passage for direct supply of another part of the oxygen produced by the air separation unit to the burners, said method which comprises regulating a rate of supply of directly supplied oxygen to burners to a total amount of oxygen supplied by the air separation unit within an operating range where $NO_X$ density of the exhaust gas is below a $NO_X$ limit value and an amount of unburned combustibles in the exhaust gas is below an unburned combustible limit value.

In the method of controlling exhaust gas in the oxyfuel combustion boiler, it is preferable that the operating range of the rate of supply of directly supplied oxygen to the total amount of oxygen supplied to the boiler is 5 to 15%.

In the method of controlling exhaust gas in the oxyfuel combustion boiler, it is preferable that a part of oxygen produced by the air separation unit is supplied to the primary recirculation passage.

In the method of controlling exhaust gas in the oxyfuel combustion boiler, it is preferable that $NO_x$ density is measured at respective portions of the boiler and a supply of directly supplied oxygen to each of burners is respectively regulated on the basis of measured values of $NO_x$ density measured at the respective portions of the boiler.

The invention is also directed to an apparatus of controlling exhaust gas in an oxyfuel combustion boiler having a primary recirculation passage for introduction of a part of exhaust gas in recirculation into a mill as primary recirculated exhaust gas and for supply of pulverized coal pulverized by the mill to burners of the boiler by said primary recirculated exhaust gas, a secondary recirculation passage for supply of another part of the recirculated exhaust gas to a wind box of the boiler, an air separation unit, a secondary oxygen mixing passage for supply of a part of oxygen produced by the air separation unit to the secondary recirculation passage and a direct supply passage for direct supply of another part of the oxygen produced by the air separation unit to the burners, said apparatus which comprises a secondary flowmeter disposed in the secondary oxygen mixing passage, a secondary flow rate regulator disposed in the secondary oxygen mixing passage, a direct supply meter disposed in the direct supply passage, a direct supply regulator disposed in the direct supply passage, a $NO_x$ density monitor for measuring $NO_x$ density in the exhaust gas, unburned combustible measuring means for measuring an amount of unburned combustibles in the exhaust gas, and a controller for regulating a rate of supply of directly supplied oxygen through the direct supply passage to a total amount of oxygen supplied by the air separation unit within an operating range where the $NO_x$ density measured by the $NO_x$ density monitor is below a $NO_x$ limit value and the amount of the unburned combustibles measured by the unburned combustible measuring means is below an unburned combustible limit value.

In the apparatus for controlling exhaust gas in the oxyfuel combustion boiler, it is preferable that the operating range of a rate of supply of directly supplied oxygen to a total amount of oxygen supplied to the boiler which is set to the controller is 5 to 15%.

Further, preferably, the apparatus of controlling exhaust gas in the oxyfuel combustion boiler further comprises a primary oxygen mixing passage through which a part of oxygen produced by the air separation unit is supplied to the primary recirculation passage via a primary flow rate regulator.

Furthermore, preferably, the apparatus for controlling exhaust gas in an oxyfuel combustion boiler further comprises departmental $NO_x$ density monitors for measuring $NO_x$ density at respective portions of the boiler and burner oxygen regulators each of which regulates a supply of directly supplied oxygen to the corresponding burner on the basis of measured values of $NO_x$ density measured at the respective portions of the boiler by the departmental $NO_x$ density monitors.

Advantageous Effects of Invention

According to a method and an apparatus of controlling exhaust gas in an oxyfuel combustion boiler of the invention, a rate of supply of directly supplied oxygen to burners to a total amount of oxygen supplied by the air separation unit is regulated within an operating range where the $NO_x$ density of the exhaust gas is lower than a $NO_x$ limit value and an amount of unburned combustibles in the exhaust gas is below an unburned content limit value. Thus, the invention is much advantageous in that stable combustion by an oxyfuel combustion boiler can be attained while properties of an exhaust gas are controlled within their limits.

Figure 1:
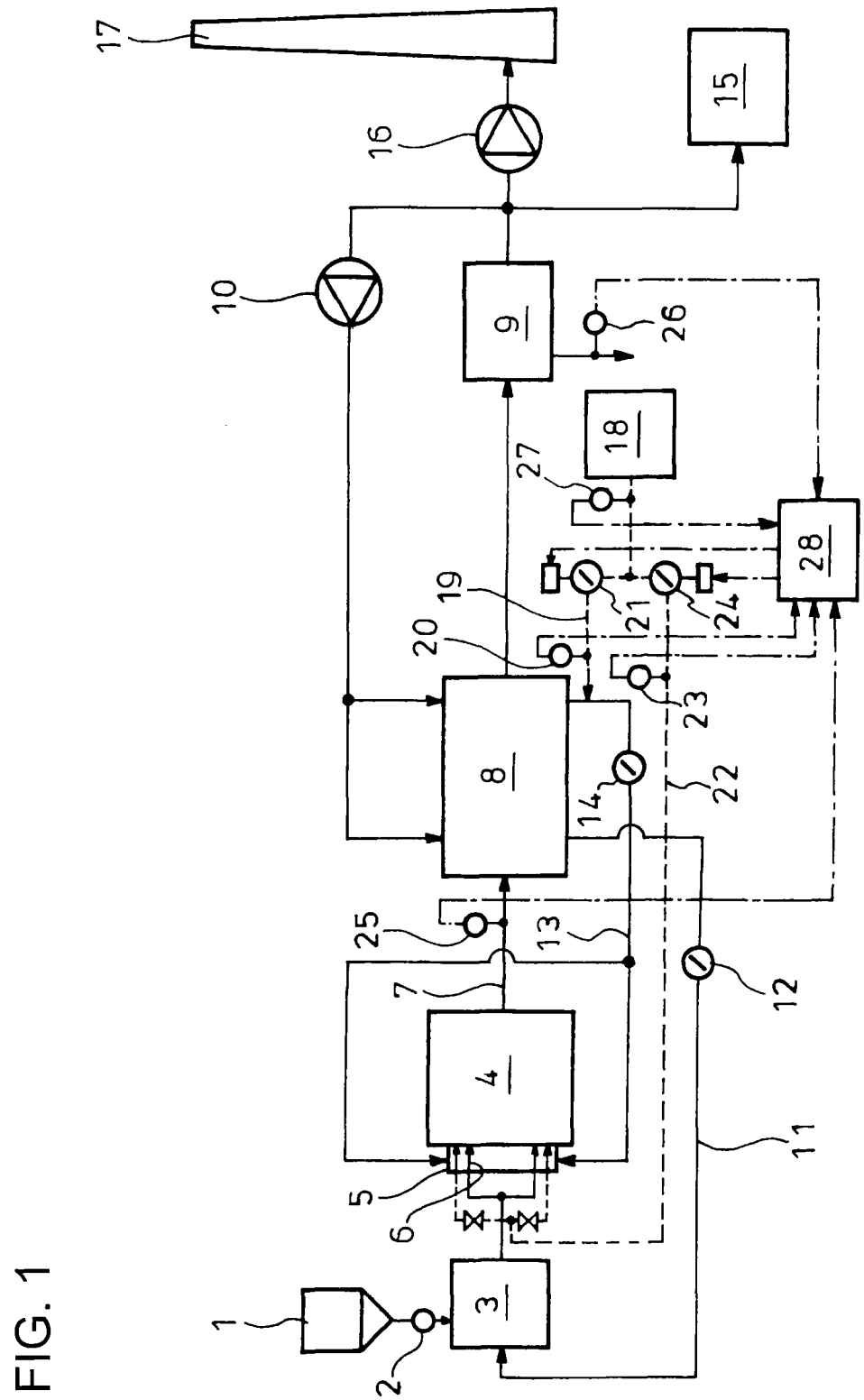
FIG. 1 is a schematic view showing an entire structure of an embodiment of the invention.

REFERENCE SIGNS LIST 3 mill
4 oxyfuel combustion boiler (boiler)
5 wind box
6 burner
11 primary recirculation passage
13 secondary recirculation passage
18 air separation unit
19 secondary oxygen mixing passage
20 secondary flowmeter
21 secondary flow rate regulator
22 direct supply passage
23 direct supply meter
24 direct supply regulator
25 $NO_x$ density monitor
26 unburned combustible measuring means
28 controller
29 departmental $NO_x$ density monitors
30 burner oxygen regulator
31 primary flow rate regulator
32 primary oxygen mixing passage
G operating range

DESCRIPTION OF EMBODIMENTS

Hereinafter, an embodiment of the invention will be described with reference to the accompanying drawings.

Figure 2:
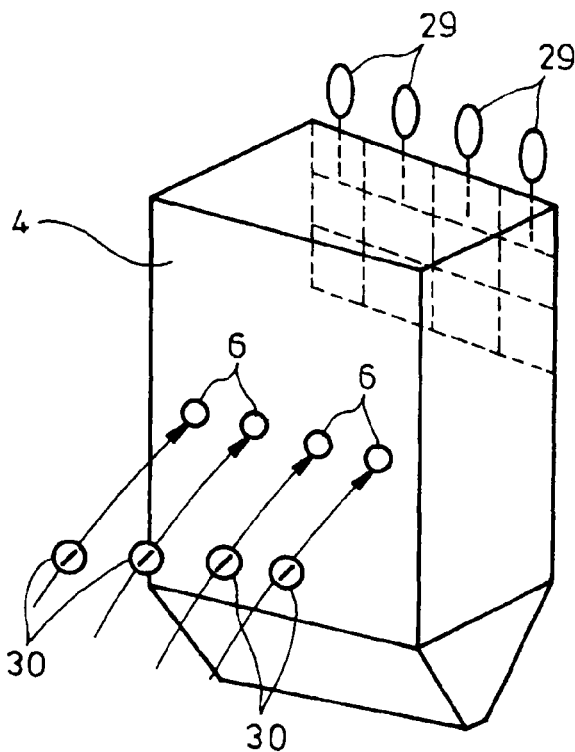
FIG. 2 is a perspective view showing an example which is configured to regulate a supply of directly supplied oxygen to each burner.
Figure 3:
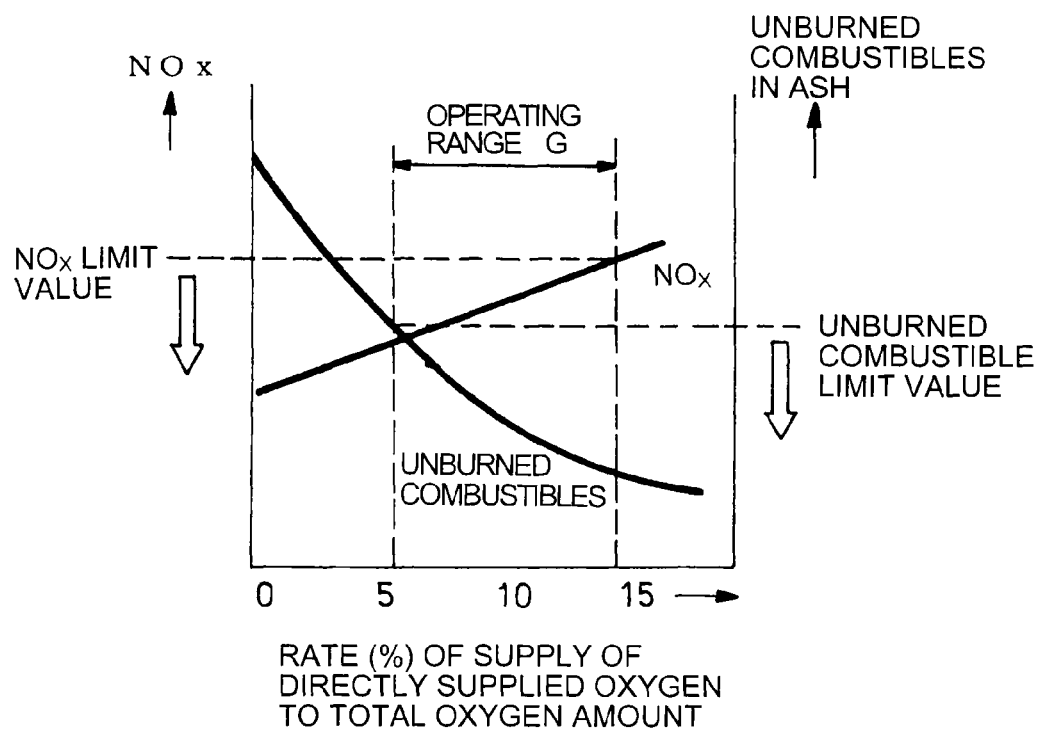
FIG. 3 is a diagram showing an operating range in the embodiment of the invention.

FIGS. 1 to 3 show the embodiment of the invention. Reference numeral 1 denotes a coal bunker for storage of coal; 2, a coal feeder for feeding of the coal stored in the bunker 1; 3, a mill for pulverization and drying of the coal from the feeder 2; 4, an oxyfuel combustion boiler; 5, a wind box mounted on the boiler 4; 6, burners provided in the wind box 5 for combustion of the pulverized coal from the mill 3; 7, an exhaust gas line through which flows an exhaust gas from the boiler 4; 8, an air preheater for heat exchange of the exhaust gas flowing through the exhaust gas line 7 with primary and secondary recirculated exhaust gases; 9, exhaust gas treatment devices such as a desulfurization device and a dust collector for treatment of the exhaust gas having passed through the air preheater 8; 10, a forced draft fan (FDF) for sending under pressure the exhaust gas purified by the exhaust gas treatment devices 9 as the primary and secondary recirculated exhaust gases; 11, a primary recirculation passage for preheating, using the air preheater 8, a part of the exhaust gas pumped by the forced draft fan 10 to lead the same as primary recirculated exhaust gas to the mill 3; 12, a flow rate regulating valve for regulating a flow rate of the primary recirculated exhaust gas; 13, a secondary recirculation passage for preheating, using the air preheater 8, another part of the exhaust gas pumped by the forced draft fan 10 to lead the same as secondary recirculated exhaust gas to the wind box 5; 14, a flow rate regulating valve for regulating a flow rate of the secondary recirculated exhaust gas; 15, a capture device for taking therein the exhaust gas purified by the exhaust gas treatment devices 9 to capture $CO_2$, etc., from the exhaust gas; 16, an induced draft fan (IDF) disposed downstream of the exhaust gas treatment devices 9 for inducing the exhaust gas; and 17, a stack through which the exhaust gas purified by the exhaust gas treatment devices 9 and induced by the induced draft fan 16 is discharged to the atmosphere.

In the above-mentioned structure, an air separation unit 18 is further provided which takes therein air to produce oxygen. A part of the oxygen produced by the air separation unit 18 is fed as secondary oxygen to the secondary recirculation passage 13 via a secondary oxygen mixing passage 19 which is provided with a secondary flowmeter 20 and a secondary flow rate regulator 21. Exemplified in the illustrated embodiment is a case where the secondary oxygen is supplied to the secondary recirculation passage 13 downstream of the air preheater 8; alternatively, the secondary oxygen may be supplied upstream of the air preheater 8.

Another part of the oxygen produced by the air separation unit 18 is supplied directly to the burners 6 as directly supplied oxygen through a direct supply passage 22 which is provided with a direct supply meter 23 and a direct supply regulator 24.

Furthermore, there are a $NO_x$ density monitor 25 for measurement of $NO_x$ density in the exhaust gas at an outlet of the oxyfuel combustion boiler 4, unburned combustible measuring means 26 for measurement of unburned combustibles in the exhaust gas from solids obtained by the dust collection by the exhaust gas treatment devices 9 and an oxygen amount meter 27 for measurement of a total amount of oxygen supplied by the air separation unit 18. As the unburned combustible measuring means 26, a device capable of automatically measuring the amount of the unburned combustibles may be used; alternatively, generally and conventionally executed manual analysis may be used.

Moreover, there is provided a controller 28 to which inputted are a supply of secondary oxygen measured by the secondary flowmeter 20, a supply of directly supplied oxygen measured by the direct supply meter 23, a $NO_x$ density measured by the $NO_x$ density monitor 25, an amount of the unburned combustibles measured by the unburned combustible measuring means 26 and a total amount of oxygen measured by the oxygen amount meter 27. Thus, the controller 28 regulates the secondary flow rate regulator 21 and the direct supply regulator 24 such that a rate of supply of directly supplied oxygen, which is directly supplied to the burners 6 through the direct supply passage 22, to the total amount of oxygen supplied by the air separation unit 18 is within a predetermined operating range where $NO_x$ density and the amount of unburned combustibles in exhaust gas are maintained properly.

The supply of the directly supplied oxygen to the burners 6 through the direct supply passage 22 may be carried out such that the plural burners 6 of the boiler 4 are uniformly and collectively supplied with the direct supply oxygen. Alternatively, the oxygen may be supplied to the burners 6 in plural stages such that a flow rate of oxygen is regulated for each stage of burners 6.

Further, as shown in FIG. 2, there may be provided departmental $NO_x$ density monitors 29 which measure $NO_x$ density at respective portions of the boiler corresponding to respective lines of the plural burners 6 arranged widthwise of the boiler 4, and burner oxygen regulators 30 each of which regulate a supply of directly supplied oxygen to the corresponding burner 6, on the basis of measured values of $NO_x$ density measured at the respective portions of the boiler by the $NO_x$ density monitors 29. According to this structure, regulation may be conducted such that the density of $NO_x$ generated in the boiler is substantially uniform.

The inventors obtained test results shown in FIG. 3 by performing a combustion test in a test boiler for oxyfuel combusting of pulverized coal to investigate a relationship between the $NO_x$ density measured by the $NO_x$ density monitor 25 and the unburned combustibles in ash measured by the unburned combustible measuring means 26 when a rate of supply of directly supplied oxygen to the burners 6 through the direct supply passage 22 was changed to the total amount of oxygen which is supplied by the air separation unit 18 in accordance with a supply of pulverized coal.

As apparent from FIG. 3, as the rate of supply of directly supplied oxygen was increased, $NO_x$ density substantially linearly increased. Meanwhile, unburned combustibles rapidly decreased until the rate of supply of directly supplied oxygen became about 10%. Even though the rate of supply of directly supplied oxygen was increased thereafter, the decrease of the unburned combustibles tended to slow. Here, like in a boiler in the related art, an upper limit of $NO_x$ density was set, an upper limit of unburned combustibles was set and an operating range G was set where $NO_x$ density was not higher than the $NO_x$ limit value and unburned combustibles were not higher than the unburned content limit value. The operating range G of the combustion test, which was performed by the inventors, was about 5 to 15%. Here, the $NO_x$ limit value is limited, for example, by a regulation on a $NO_x$ density or a total emission in a power station and, for example, 180 ppm with which a practical case is present in terms of conversion into a density at a boiler outlet may be employed as a $NO_x$ limit value. The unburned combustible limit value, which is directly related to the efficiency of a boiler, may be limited to 5% or less as practical cases. Further, the unburned combustibles in ash may be limited depending upon the purpose of use of ash, for example, in a case where the ash is used as a material for cement.

Accordingly, when the rate of supply of directly supplied oxygen to the burners 6 through the direct supply passage 22 to the total amount of oxygen supplied by the air separation unit 18 was regulated in the operating range G of, for example, about 5 to 15%, stable combustion of an oxyfuel combustion boiler could be attained with properties of exhaust gas being maintained within their allowable ranges.

Operations of the illustrated embodiment will be described.

In the above-mentioned oxyfuel combustion boiler 4, the coal stored in the bunker 1 is charged by the feeder 2 into the mill 3 where the coal is pulverized into pulverized coal. The primary recirculated exhaust gas, which is a part of the exhaust gas taken out by the forced draft fan (FDF) 10 downstream of the exhaust gas treatment devices 9, is introduced through the primary recirculation passage 11 into the mill 3 to dry the coal charged in the mill 3 and transfer the pulverized coal to the burners 6 of the boiler 4.

Meanwhile, another part of the exhaust gas from the forced draft fan 10 is supplied as the secondary recirculated exhaust gas to the wind box 5 of the boiler 4 through the secondary recirculation passage 13.

Further, a part of oxygen produced by the air separation unit 18 is supplied to the secondary recirculation passage 13 through the secondary oxygen mixing passage 19, and another part of oxygen produced by the air separation unit 18 is directly supplied to the burners 6 through the direct supply passage 22.

Accordingly, the pulverized coal supplied from the mill 3 to the burners 6 is burned with the primary recirculated exhaust gas supplied to the wind box 5 in mixture with the oxygen and with the oxygen directly supplied to the burners 6. Exhaust gas generated by the combustion preheats the primary and secondary recirculated exhaust gases through the air preheater 8, is treated by the exhaust gas treatment devices 9 and is partly introduced into the forced draft fan 10 and the capture device 15. The rest of the exhaust gas is induced by the induced draft fan (IDF) and is discharged through the stack 17 to the atmosphere. The exhaust gas introduced into the capture device 15 is subject to capture of $CO_2$ and the like.

Figure 4:
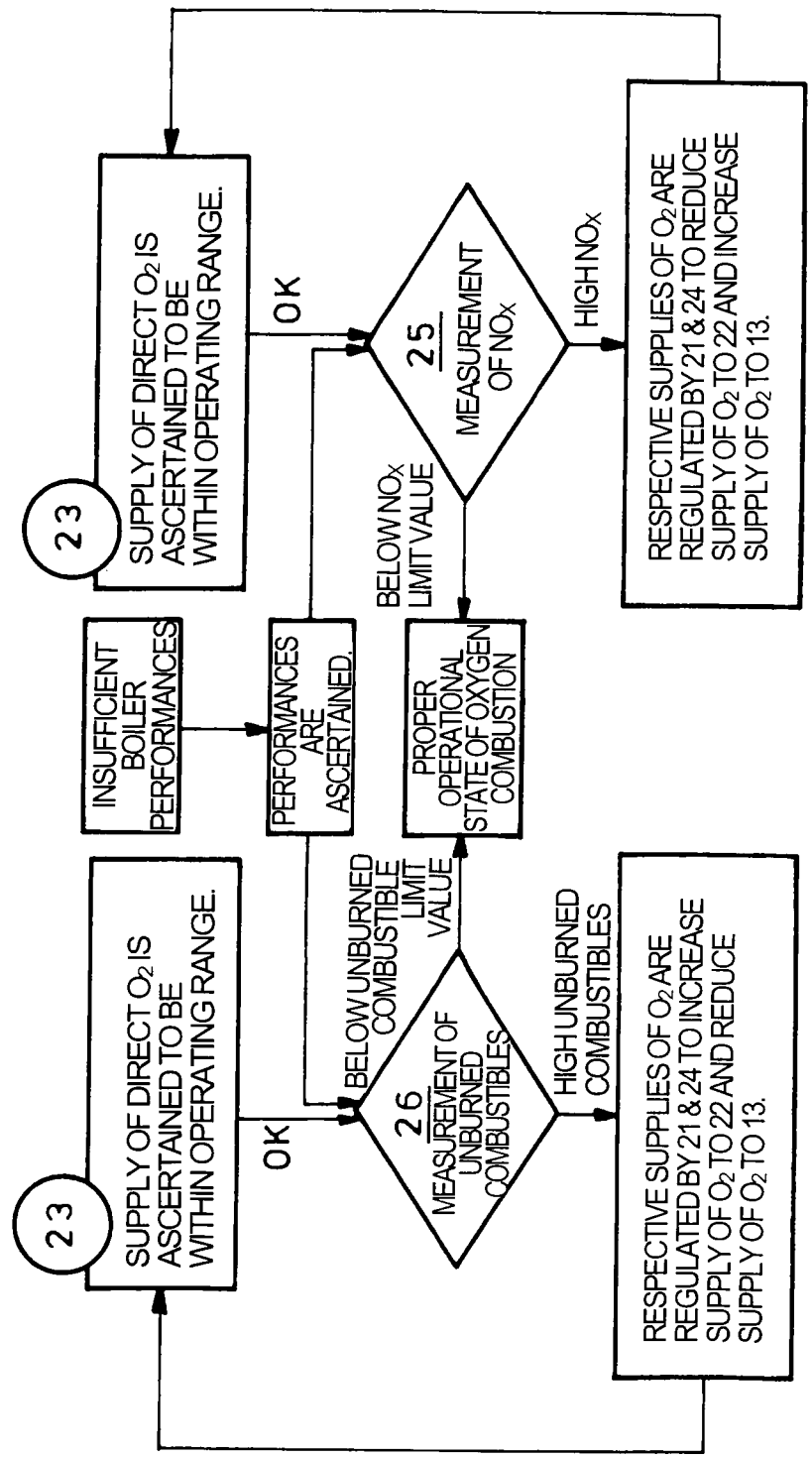
FIG. 4 is a flowchart showing a control flow in the embodiment of the invention.

Inputted into the controller 28 are a supply of secondary oxygen measured by the secondary flowmeter 20, a supply of directly supplied oxygen measured by the direct supply meter 23, a $NO_x$ density measured by the $NO_x$ density monitor 25, an amount of the unburned combustibles measured by the unburned combustible measuring means 26 and a total amount of oxygen supplied by the air separation unit 18 and measured by the oxygen amount meter 27. The controller 28 performs the control with a control flow as shown in FIG. 4.

It is ascertained by the controller 28 that the supply of directly supplied oxygen measured by the direct supply meter 23 is within the operating range G shown in FIG. 3. Performances such as heat absorption of the boiler are ascertained by a control system (not shown) so as to make control such that the performances of the boiler are maintained stable.

In this state, if the amount of the unburned combustibles measured by the unburned combustible measuring means 26 is below the unburned combustible limit value and the $NO_x$ density measured by the $NO_x$ density monitor 25 is below the $NO_x$ limit value, oxyfuel combustion is properly performed.

If the amount of the unburned combustibles measured by the unburned combustible measuring means 26 is higher than the unburned content limit value, the direct supply regulator 24 and/or the secondary flow rate regulator 21 is regulated to perform an operation of increasing the supply of directly supplied oxygen to the direct supply passage 22, an operation of reducing the supply of the secondary oxygen to the secondary recirculation passage 13 or an operation of increasing the supply of directly supplied oxygen to the direct supply passage 22 and of reducing the supply of the secondary oxygen to the secondary recirculation passage 13, so that a control of reducing unburned combustibles is performed with the supply of the directly supplied oxygen being within the operating range G.

Further, if the NO density measured by the $NO_x$ density monitor 25 is higher than the $NO_x$ limit value, the direct supply regulator 24 and/or the secondary flow rate regulator 21 is regulated to perform an operation of reducing the supply of directly supplied oxygen to the direct supply passage 22, an operation of increasing the supply of the secondary oxygen to the secondary recirculation passage 13 or an operation of reducing the supply of directly supplied oxygen to the direct supply passage 22 and of increasing the supply of the secondary oxygen to the secondary recirculation passage 13, so that a control of reducing $NO_x$ density is performed with the supply of the directly supplied oxygen being within the operating range G.

In this case, as shown in FIG. 2, if each of the burner oxygen regulators 30 regulates a supply of directly supplied oxygen to the corresponding burner 6 on the basis of measured values of $NO_x$ density measured by the departmental $NO_x$ density monitors at the respective portions corresponding to the respective lines of the plural burners 6 arranged widthwise of the boiler 4, the $NO_x$ density of the exhaust gas discharged from the boiler 4 is maintained substantially uniform. This brings about an advantage of stabilizing the control on the basis of the density measured by the $NO_x$ density monitor 25.

As described above, if the rate of supply of directly supplied oxygen to the burners 6 through the direct supply passage 22 is regulated to the total amount of oxygen supplied by the air separation unit 18 in the operating range G, stable combustion by the oxyfuel combustion boiler can be attained while the unburned combustibles and $NO_x$ density of the exhaust gas are maintained in predetermined allowable ranges.

Figure 5:
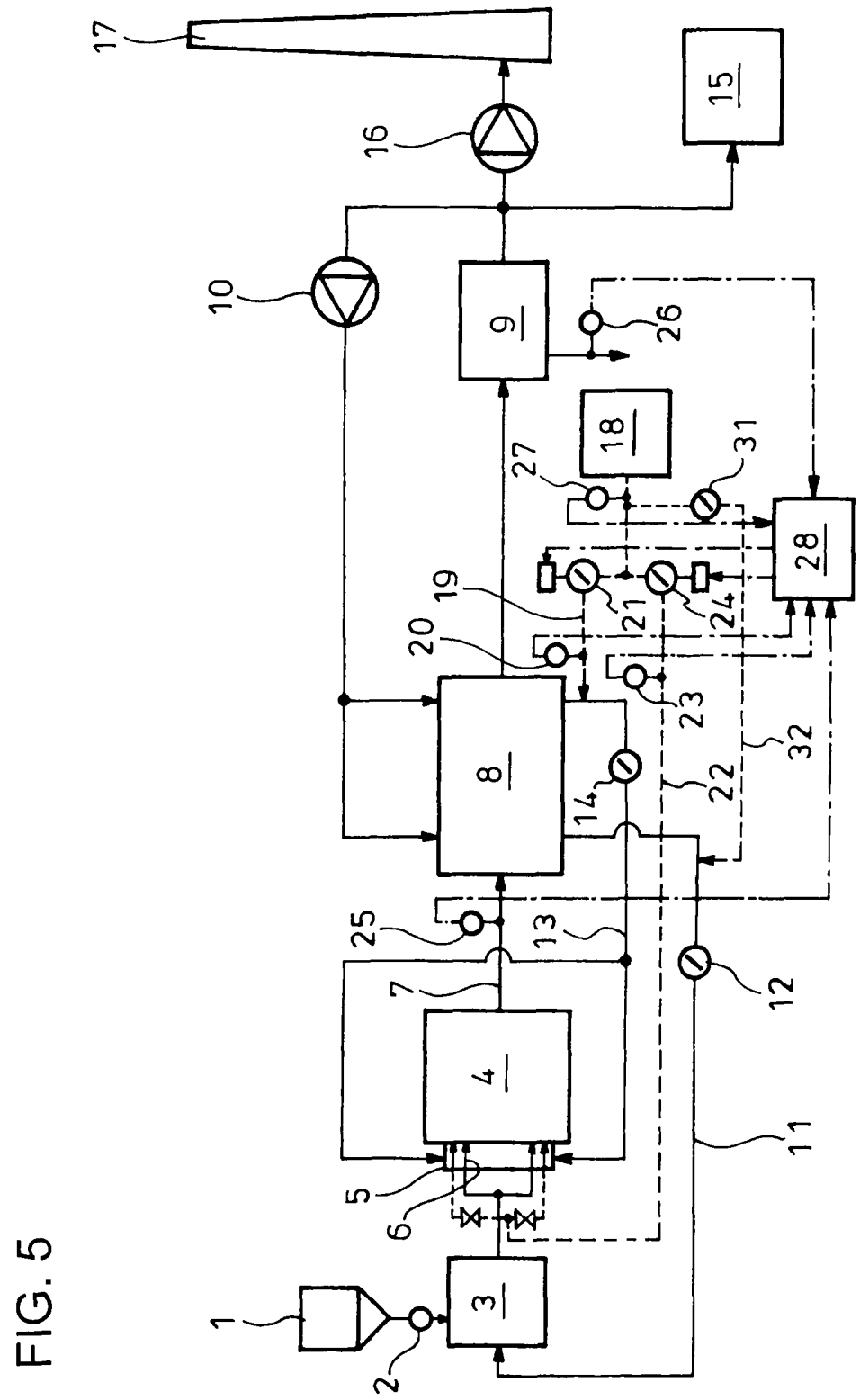
FIG. 5 is a schematic view showing the entire structure of a modification which is configured to supply a part of oxygen to a primary recirculation passage.

FIG. 5 shows a modification that a primary oxygen mixing passage 32 is provided for supplying a part of oxygen produced by the air separation unit 18 to the primary recirculation passage 11 through a primary flow rate regulator 31. Exemplified in FIG. 5 is a case where a part of oxygen at the outlet of the air separation unit 18 is branched and supplied to the primary recirculation passage 11. Alternatively, the oxygen of the secondary oxygen mixing passage 19 may be branched and supplied to the primary recirculation passage 11 through the primary flow rate regulator. Alternatively, the oxygen of the direct supply passage 22 may be branched and supplied to the primary recirculation passage 11 through the primary flow rate regulator.

If the amount of oxygen of the primary recirculation passage 11 is less, there is a possibility that the flame of the burner 6 may be flown off during a low load operation or the like. However, if a part of oxygen is supplied to the primary recirculation passage 11 as shown in FIG. 5, the flame is prevented from flashing being blown off a low load operation or the like. Accordingly, it may be possible to attain stable oxyfuel combustion.

It is to be understood that a method and an apparatus of controlling exhaust gas in an oxyfuel combustion boiler according to the invention are not limited to the above embodiment and that various changes and modifications may be made without departing from the scope of the invention.

INDUSTRIAL APPLICABILITY

Stable combustion by an oxyfuel combustion boiler can be attained while properties of exhaust gas are controlled within their limits.

The invention claimed is:

1. A method of controlling exhaust gas in an oxyfuel combustion boiler having a primary recirculation passage for introduction of a part of exhaust gas in recirculation from downstream of an exhaust gas treatment device into a mill as primary recirculated exhaust gas and for supply of pulverized coal pulverized by the mill to burners of the boiler by said primary recirculated exhaust gas, a secondary recirculation passage for supply of another part of the recirculated exhaust gas to a wind box of the boiler, an air separation unit, a secondary oxygen mixing passage for supply of a part of oxygen produced by the air separation unit to the secondary recirculation passage and a direct supply passage for direct supply of another part of the oxygen produced by the air separation unit to the burners, said method comprising:

arranging a $NO_x$ density monitor for measurement of $NO_x$ density in the exhaust gas at an outlet of the boiler and an unburned combustible measuring device for measurement of unburned combustibles in the exhaust gas from solids obtained by dust collection by the exhaust gas treatment devices;

presetting an operating range where $NO_x$ density of the exhaust gas is below a $NO_x$ limit value, and an amount of unburned combustibles in the exhaust gas is below an unburned combustible limit value based on the $NO_x$ density and the amount of unburned combustibles in the exhaust gas obtained by performing a combustion test of changing a rate of supply of directly supplied oxygen to the burners through the direct supply passage to the total amount of oxygen supplied by the air separation unit in accordance with a supply of pulverized coal; and regulating the rate of supply of directly supplied oxygen to the burners to the total amount of oxygen supplied by the air separation unit to maintain the operating range where $NO_x$ density of the exhaust gas measured by the $NO_x$ density monitor is below the $NO_x$ limit value and the amount of unburned combustibles in the exhaust gas measured by the unburned combustible measuring device is below the unburned combustible limit value.

2. The method of controlling exhaust gas in an oxyfuel combustion boiler as claimed in claim 1, wherein the operating range of the rate of supply of directly supplied oxygen to the total amount of oxygen is 5 to 15%.

3. The method of controlling exhaust gas in an oxyfuel combustion boiler as claimed in claim 1 or 2, wherein a part of oxygen produced by the air separation unit is supplied to the primary recirculation passage.

4. The method of controlling exhaust gas in an oxyfuel combustion boiler as claimed in claim 1, wherein $NO_x$ density is measured at respective portions of the boiler and a supply of directly supplied oxygen to each of burners is regulated on the basis of measured values of $NO_x$ density measured at the respective portions of the boiler.

5. The method of controlling exhaust gas in an oxyfuel combustion boiler as claimed in claim 2, wherein $NO_x$ density is measured at respective portions of the boiler and a supply of directly supplied oxygen to each of burners is regulated on the basis of measured values of $NO_x$ density measured at the respective portions of the boiler.

6. The method of controlling exhaust gas in an oxyfuel combustion boiler as claimed in claim 3, wherein $NO_x$ density is measured at respective portions of the boiler and a supply of directly supplied oxygen to each of burners is regulated on the basis of measured values of $NO_x$ density measured at the respective portions of the boiler.

7. An apparatus of controlling exhaust gas in an oxyfuel combustion boiler having a primary recirculation passage for introduction of a part of exhaust gas from downstream of an exhaust gas treatment device in recirculation into a mill as primary recirculated exhaust gas and for supply of pulverized coal pulverized by the mill to burners of the boiler by said primary recirculated exhaust gas, a secondary recirculation passage for supply of another part of the recirculated exhaust gas to a wind box of the boiler, an air separation unit, a secondary oxygen mixing passage for supply of a part of oxygen produced by the air separation unit to the secondary recirculation passage and a direct supply passage for direct supply of another part of the oxygen produced by the air separation unit to the burners, said apparatus comprising:

a secondary flowmeter disposed in the secondary oxygen mixing passage;

a secondary flow rate regulator disposed in the secondary oxygen mixing passage;

a direct supply meter disposed in the direct supply passage;

a direct supply regulator disposed in the direct supply passage;

a $NO_x$ density monitor for measuring $NO_x$ density in the exhaust gas at an outlet of the boiler;

an unburned combustible measuring device which measures an amount of unburned combustibles in the exhaust gas from solids obtained by dust collection by the exhaust gas treatment device;

an oxygen amount meter for measurement of a total amount of oxygen supplied by the air separation unit; and a controller configured to preset an operating range where $NO_x$ density of the exhaust gas is below a $NO_x$ limit value, and an amount of unburned combustibles in the exhaust gas is below an unburned combustible limit value based on the $NO_x$ density and the amount of unburned combustibles in the exhaust gas obtained by performing a combustion test of changing a rate of supply of directly supplied oxygen to the burners through the direct supply passage to the total amount of oxygen supplied by the air separation unit in accordance with a supply of pulverized coal, and regulate the rate of supply of directly supplied oxygen through the direct supply passage to the total amount of oxygen supplied by the air separation unit to maintain the operating range where the $NO_x$ density measured by the $NO_x$ density monitor is below the $NO_x$ limit value and the amount of the unburned combustibles in the exhaust gas measured by the unburned combustible measuring device is below the unburned combustible limit value.

8. The apparatus of controlling exhaust gas in an oxyfuel combustion boiler as claimed in claim 7, wherein the operating range of the rate of supply of directly supplied oxygen to the total amount of oxygen which is set to the controller is 5 to 15%.

9. The apparatus of controlling exhaust gas in an oxyfuel combustion boiler as claimed in claim 7 or 8, further comprising a primary oxygen mixing passage through which a part of oxygen produced by the air separation unit is supplied to the primary recirculation passage via a primary flow rate regulator.

10. The apparatus of controlling exhaust gas in an oxyfuel combustion boiler as claimed in claim 7, further comprising departmental $NO_x$ density monitors for measuring $NO_x$ density at respective portions of the boiler and burner oxygen regulators each of which regulates a supply of directly supplied oxygen to the corresponding burner on the basis of measured values of $NO_x$ density measured at the respective portions of the boiler by the departmental $NO_x$ density monitors.

11. The apparatus of controlling exhaust gas in an oxyfuel combustion boiler as claimed in claim 8, further comprising departmental $NO_x$ density monitors for measuring $NO_x$ density at respective portions of the boiler and burner oxygen regulators each of which regulates a supply of directly supplied oxygen to the corresponding burner on the basis of measured values of $NO_x$ density measured at the respective portions of the boiler by the departmental $NO_x$ density monitors.

12. The apparatus of controlling exhaust gas in an oxyfuel combustion boiler as claimed in claim 9, further comprising departmental $NO_x$ density monitors for measuring $NO_x$ density at respective portions of the boiler and burner oxygen regulators each of which regulates a supply of directly supplied oxygen to the corresponding burner on the basis of measured values of $NO_x$ density measured at the respective portions of the boiler by the departmental $NO_x$ density monitors.

13. The method of controlling exhaust gas in an oxyfuel combustion boiler as claimed in claim 1, wherein the unburned combustible measuring device automatically measures the amount of unburned combustibles in the exhaust gas.

14. The apparatus of controlling exhaust gas in an oxyfuel combustion boiler as claimed in claim 7, wherein the unburned combustible measuring device automatically measures the amount of unburned combustibles in the exhaust gas.

15. A method of controlling exhaust gas in an oxyfuel combustion boiler having a primary recirculation passage for introduction of a part of exhaust gas in recirculation from downstream of an exhaust gas treatment device into a mill as primary recirculated exhaust gas and for supply of pulverized coal pulverized by the mill to burners of the boiler by said primary recirculated exhaust gas, a secondary recirculation passage for supply of another part of the recirculated exhaust gas to a wind box of the boiler, an air separation unit, a secondary oxygen mixing passage for supply of a part of oxygen produced by the air separation unit to the secondary recirculation passage and a direct supply passage for direct supply of another part of the oxygen produced by the air separation unit to the burners, said method comprising:

arranging a $NO_x$ density monitor for measurement of $NO_x$ density in the exhaust gas at an outlet of the boiler;

measuring an amount of unburned combustibles in the exhaust gas by manual analysis;

presetting an operating range where $NO_x$ density of the exhaust gas is below a $NO_x$ limit value, and the amount of unburned combustibles in the exhaust gas is below an unburned combustible limit value based on the $NO_x$ density and the amount of unburned combustibles in the exhaust gas obtained by performing a combustion test of changing a rate of supply of directly supplied oxygen to the burners through the direct supply passage to the total amount of oxygen supplied by the air separation unit in accordance with a supply of pulverized coal; and regulating the rate of supply of directly supplied oxygen to the burners to the total amount of oxygen supplied by the air separation unit to maintain the operating range where $NO_x$ density of the exhaust gas measured by the $NO_x$ density monitor is below the $NO_x$ limit value and the amount of unburned combustibles in the exhaust gas is below the unburned combustible limit value.

\* \* \* \* \*